(12) United States Patent
Creek

(10) Patent No.: US 11,409,494 B2
(45) Date of Patent: Aug. 9, 2022

(54) IN-WALL WIRELESSLY OPERABLE SPEAKER CONTROL SYSTEM

(71) Applicant: Domonic T. Creek, Marshall, VA (US)

(72) Inventor: Domonic T. Creek, Marshall, VA (US)

( * ) Notice: Subject to any disclaimer, the term of this patent is extended or adjusted under 35 U.S.C. 154(b) by 94 days.

(21) Appl. No.: 16/862,555

(22) Filed: Apr. 29, 2020

(65) Prior Publication Data

US 2020/0341722 A1 Oct. 29, 2020

Related U.S. Application Data

(60) Provisional application No. 62/839,896, filed on Apr. 29, 2019.

(51) Int. Cl.
*H04R 3/00* (2006.01)
*G06F 3/16* (2006.01)

(52) U.S. Cl.
CPC .............. *G06F 3/165* (2013.01); *H04R 3/00* (2013.01); *H04R 2420/01* (2013.01); *H04R 2420/07* (2013.01); *H04R 2430/01* (2013.01)

(58) Field of Classification Search
CPC .. H04R 3/00; H04R 2420/01; H04R 2420/07; H04R 2430/01; H04R 1/026; H04R 2201/021; H04R 2227/05; H04R 2201/028; G06F 3/165; G06F 3/162; G08C 2201/40; G08C 2201/93
USPC ............................................. 700/94; 381/387
See application file for complete search history.

(56) References Cited

U.S. PATENT DOCUMENTS

| 10,084,300 | B1 * | 9/2018 | Glahe | F16M 13/02 |
| 2004/0202346 | A1 * | 10/2004 | Park | H04R 1/026 381/386 |
| 2010/0322455 | A1 * | 12/2010 | Carlson | H04R 1/028 381/387 |
| 2018/0041825 | A1 * | 2/2018 | Starobin | H04R 1/026 |
| 2019/0215590 | A1 * | 7/2019 | Manouel | H04R 1/026 |
| 2020/0029709 | A1 * | 1/2020 | Felder | B65D 51/16 |

* cited by examiner

*Primary Examiner* — Melur Ramakrishnaiah

(57) ABSTRACT

An in-wall wirelessly operable speaker control system has a control unit configured to be mounted into a wall or similar surface, particularly an electrical socket cavity. A mobile phone or other computing device may be communicably coupled with a processing unit of the control unit through a wireless communication device of the control unit. The processing unit is communicably coupled with one or more speakers. Input may be received through the wireless communication device from the computing device in order to control playback of media items through the coupled speakers.

6 Claims, 4 Drawing Sheets

IN-WALL WIRELESSLY OPERABLE SPEAKER CONTROL SYSTEM

The current application claims a priority to the U.S. Provisional Patent application Ser. No. 62/839,896 filed on Apr. 29, 2019.

FIELD OF THE INVENTION

The present invention relates generally to audio equipment. More particularly, the present invention relates to wireless control of speakers through a computing device.

BACKGROUND OF THE INVENTION

Music is a ubiquitous part of life for many. Music can be played using various equipment including but not limited to, radios, mobile devices, or portable music players. Many people only use a single Bluetooth speaker in the house, because the user can simply control the speaker from portable devices. However, small Bluetooth speakers usually do not have great sound quality. Home theater systems, for example, provide great sound quality, however, they are hard to install, expensive, and have many running wires. In addition, these systems can take up a significant amount of space when installed in a room.

The present invention aims to solve some of these problems by providing a wall-mounted amplifier that contains a control assembly and the speaker assembly which may be integrated into the wall or other surfaces. The user can still enjoy the convenience of controlling the sound from the portable device while enjoying a better sound quality compared to the small Bluetooth speaker. Moreover, the present invention costs less than those giant speakers and occupies less space due to its wall-mounting feature. The user may purchase different size of speakers according to the size of the room or other considerations.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

Figure 1:
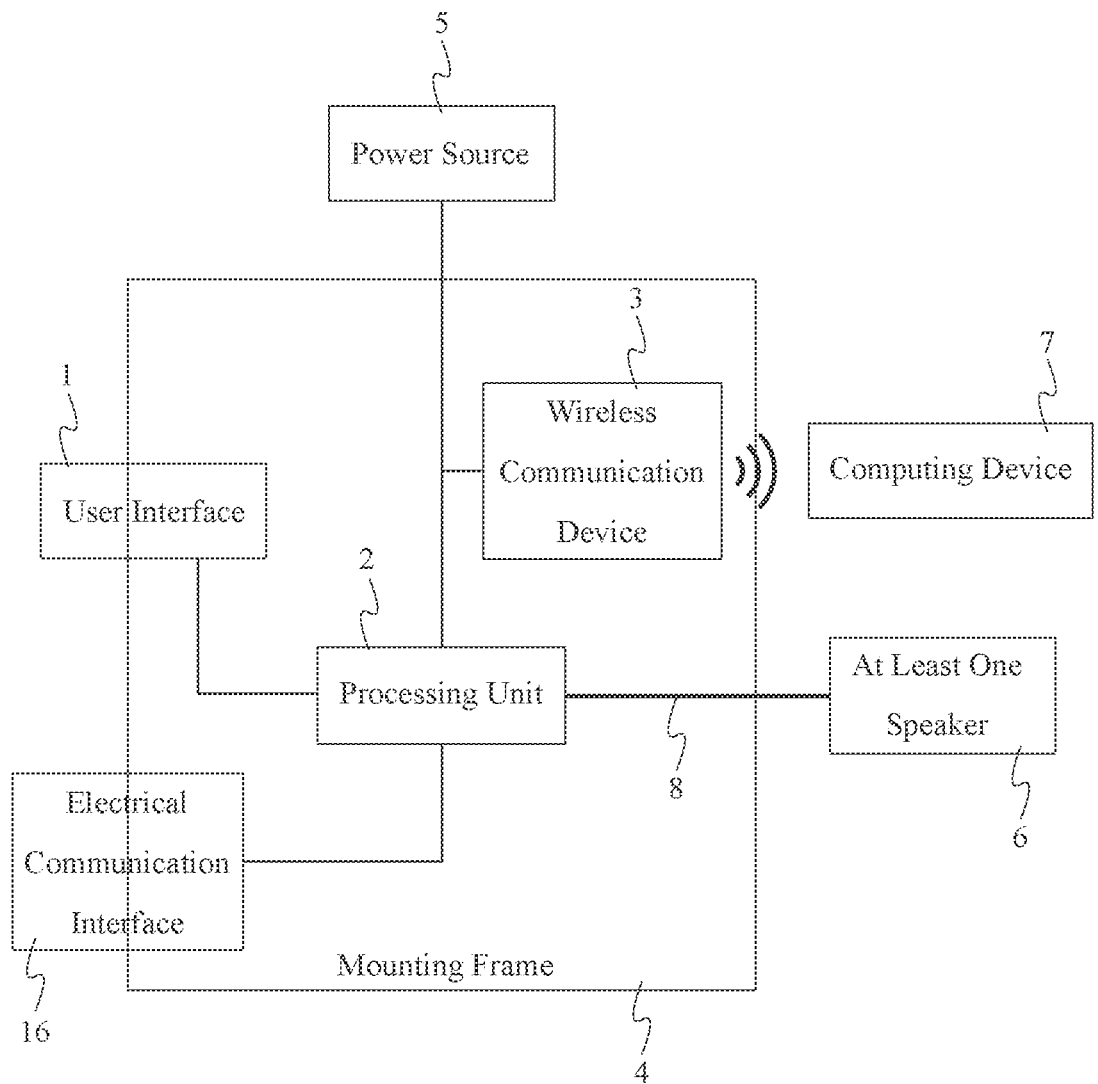
FIG. 1 is a general block diagram of the present invention.
Figure 2:
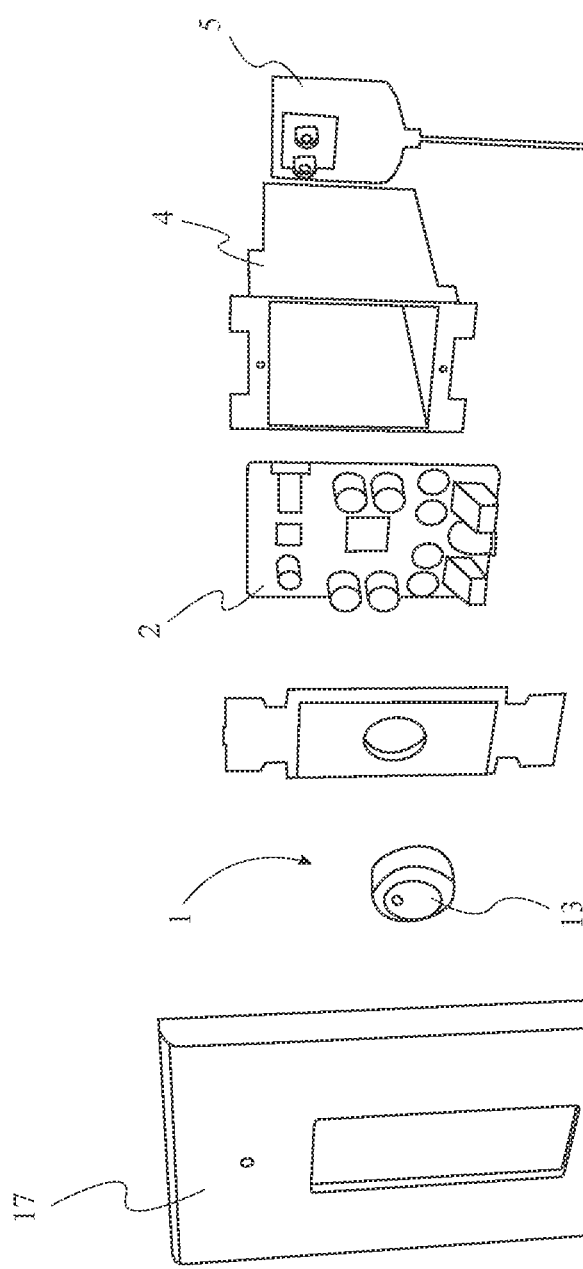
FIG. 2 is an exploded view of one exemplary embodiment of the present invention.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is a wall-mounted wireless amplifier with a control unit that provides better sound quality than a small Bluetooth speaker, but with more affordable price, and less running wires comparing to typical speakers in a home theater system. The user can enjoy the convenience of playing the music from the portable device remotely by wirelessly connecting the portable device to the speaker, or the user can simply use the control unit to play the pre-stored music.

More particularly, referring to FIGS. 1-4, the present invention is an in-wall wirelessly operable speaker control system. In general, an in-wall control unit of the present invention comprises a user interface 1, a processing unit 2, a wireless communication device 3, a mounting frame 4, and a power source 5. The user interface 1 and the wireless communication device 3 are electronically connected to the processing unit 2, and the processing unit 2 and the wireless communication device 3 are electrically connected to the power source 5. In some embodiments, the processing unit 2 is communicatively coupled with the at least one speaker 6 through an electrical communication cable 8. Alternatively or additionally, in some embodiments, the processing unit 2 is communicatively coupled with the at least one speaker 6 through the wireless communication device 3.

The user interface 1, the processing unit 2, and the wireless communication device 3 are connected to the mounting frame 4, wherein the mounting frame 4 is configured to be mounted into a wall or other vertical surface or barrier internal to a building, or a horizontal surface, or any other suitable surface or installation location. More particularly, in the preferred embodiment of the present invention, the mounting frame 4 is configured to be installed into an electrical outlet cavity; as such, in the preferred embodiment, the mounting frame 4 is an electrical outlet box, though it should be understood that the mounting frame 4 may be realized in various different embodiment in any desirable configuration suitable for installation recessed into a surface.

The wireless communication device 3 may be any suitable electronic component that enables wireless electronic communication between the processing unit 2 of the present invention and any relevant extraneous electronic devices, such as, but not limited to, mobile phones, personal computers, speakers, or other devices. In the preferred embodiment of the present invention, the wireless communication device 3 may comprise, but is not limited to, a Bluetooth module, a Wi-Fi module, a cellular communications module, or other relevant and suitable components.

The processing unit 2 is configured to communicatively couple with at least one speaker 6, and the processing unit 2 is further configured to communicatively couple with a computing device 7 through the wireless communication device 3, wherein the processing unit 2 is configured to receive input signals from the computing device 7 through the wireless communication device 3 and send output signals to the at least one speaker 6 based on the input signals. It may be understood that the at least one speaker 6 may be any sound-producing device suitable to the spirit and purpose of the present invention. In various embodiments, the at least one speaker 6 may be considered extraneous to the present invention, or the at least one speaker 6 may be considered to be included as a component in the system of the present invention. Furthermore, in the general spirit of the present invention, the computing device 7 corresponds to a device possessed by a user that is capable of wirelessly communicating with the processing unit 2 of the present invention through the wireless communication device 3, such as, but not limited to, a mobile phone such as a smartphone, a tablet, desktop personal computer, laptop personal computer, or other suitable computing device 7. In some embodiments, however, the computing device 7 may be included as a component of the present invention; for example, the computing device 7 may correspond to a remote control unit provided with the in-wall control unit of the present invention.

The processing unit 2 is the electronic control and communication processing center of the present invention, comprising one or more computing device 7 such as, but not limited to, printed circuit boards (PCBs), microcontrollers, integrated circuits, resistors, capacitors, or any other electrical or electronic components suitable for achieving the purpose of the present invention. The processing unit 2 may be a singular processing chip, a motherboard, or any electronic processing component or combination of components suited to carrying out electronic management of the present invention.

In the preferred embodiment, the processing unit 2 is configured to receive at least one media playback control selection from the computing device 7 as at least one of the input signals through the wireless communication device 3; further, the processing unit 2 is configured to send at least one media playback control signal as at least one of the output signals to the at least one speaker 6 based on the at least one media playback control selection. The aforementioned actions would correspond to, for example, a user selecting a specific song, podcast, audio file, or other relevant media item to play through the at least one speaker 6, which then plays the selected media item. In another example, said actions might correspond to the user increasing the playback volume of a currently playing media item.

The user interface 1 may vary in different embodiments; in general, the user interface 1 enables a user to control the operation of the present invention by converting various inputs into instructions received and executed by the processing unit 2. In the preferred embodiment of the present invention, the user interface 1 comprises a digital display 11. The digital display 11 is electronically connected to the processing unit 2, and the digital display 11 is electronically connected to the power source 5. Furthermore, in the preferred embodiment, the digital display 11 is a touch-sensitive digital display 11 capable of receiving input through contact with the user's skin, a stylus, or other relevant contact input, though this is not necessarily a requirement in all embodiments. Furthermore, in the preferred embodiment, the processing unit 2 is configured to display at least one current media attribute on the digital display 11, wherein the current media attribute may comprise attributes such as, but not limited to, title, artist, length, or any other relevant attributes of a currently playing media item it may be desirable to display.

Moreover, in the preferred embodiment, the user interface 1 comprises at least one control element. The at least one control element may be realized through various means in various different embodiments. In some embodiments, the at least one control element may correspond to regions on the digital display 11, wherein the digital display 11 is touch-sensitive, that correspond to various inputs in the software being operated on the digital display 11. In some embodiments, the at least one control element may correspond to physical user interface 1 elements, such as, but not limited to, switches, knobs, buttons, sliders, or the like. In some embodiments, the at least one user control element 12 comprises a power switch 13. In some embodiments, the at least one user control element 12 comprises a volume control interface 14. In some embodiments, the at least one user control element 12 comprises a speaker select interface 15, wherein through actuation of the speaker select interface 15, a user may manually select between two or more speakers connected to the present invention from which to play audio media.

Furthermore, in the preferred embodiment, the present invention further comprises at least one electrical communication interface 16. Each of the at least one electrical communication interface 16 is electrically connected to the processing unit 2. Each of the at least one electrical communication interface 16 corresponds to a port, jack, socket, or other element capable of physically interfacing directly or through an electrical communication cable 8 with an extraneous electronic entity relevant to implementing the spirit and functionality of the present invention. For example, the at least one electrical communication interface 16 may comprise, but is not limited to, one or more: universal serial bus (USB) ports, 3.5 millimeter audio jacks, high definition multimedia interface (HDMI) ports, external line return (XLR) jacks, ¼ inch instrument cable jacks, ethernet ports, or any other type of interface.

Figure 3:
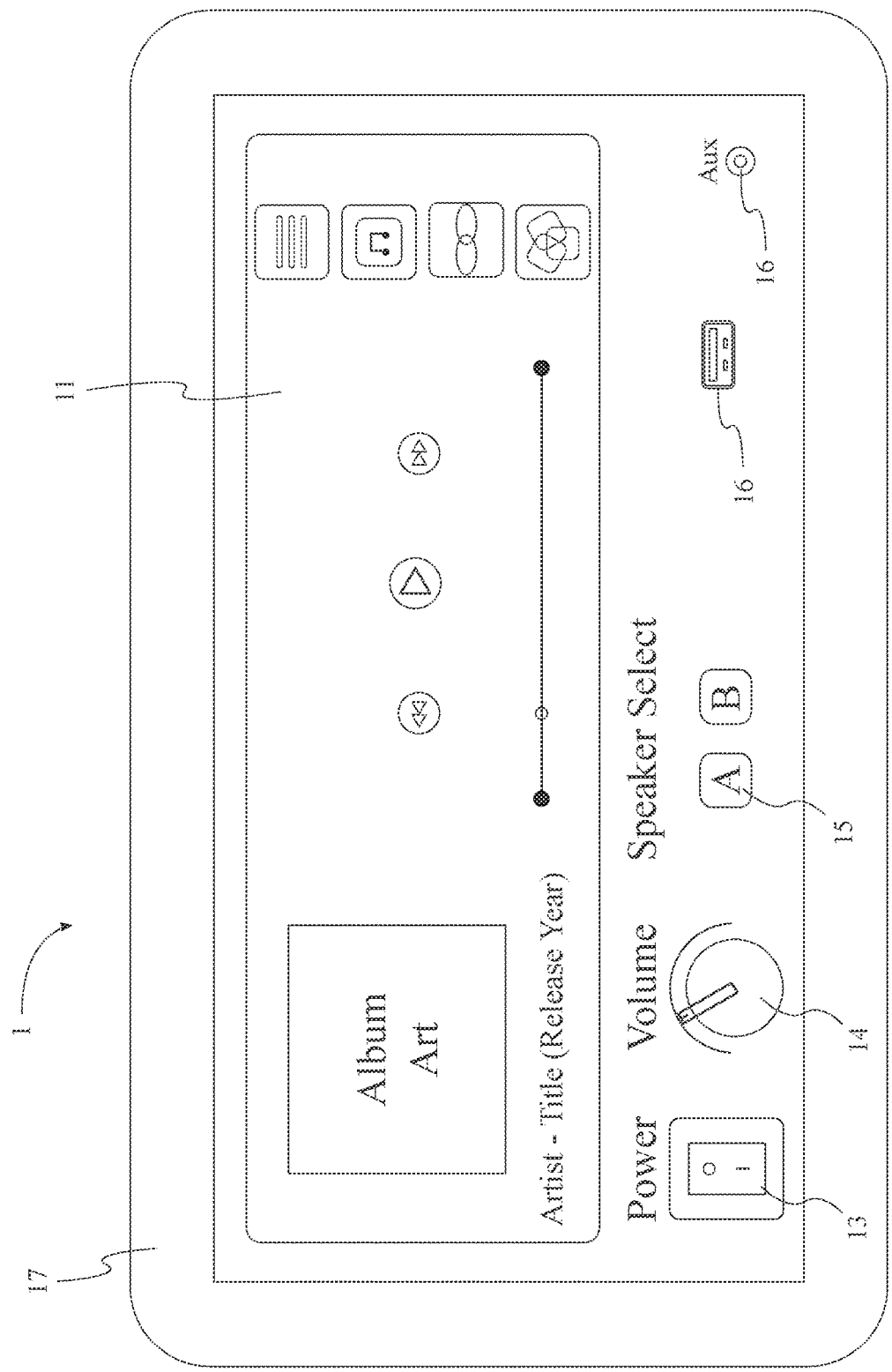
FIG. 3 is an exemplary front view of the control unit showing the user interface and electrical communication interfaces.
Figure 4:
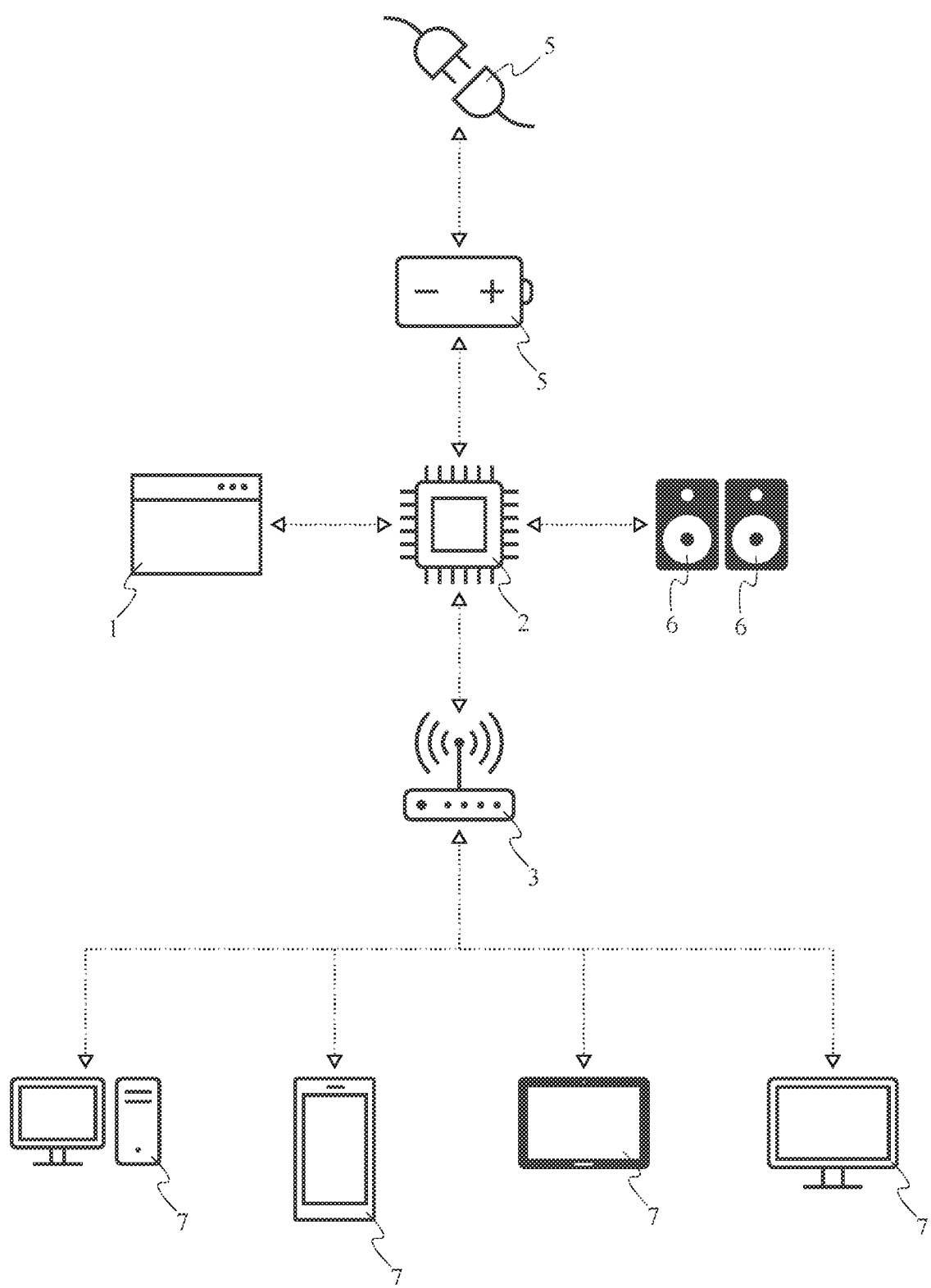
FIG. 4 is a general schematic diagram of the present invention.

Moreover, the preferred embodiment further comprises a cover plate 17 that is connected to the mounting frame 4 around the user interface 1, as shown in FIGS. 3-4. In some embodiments, each of the at least one electrical communication interface 16 traverses through the cover plate 17, so that the at least one electrical communication interface 16 is easily available for use.

The following is an alternative, exemplary description of the present invention intended to further exemplify the spirit and scope of the present invention and should not be considered to be limiting.

The present invention is a speaker device that comprises a control assembly and a speaker assembly. The control assembly further comprises a cover, a display, a switch, a plurality of sockets, an adapter plate, a control board, an outlet box, a power supply adaptor, a transmitter and a receiver. The cover is positioned near the display and is configured to prevent dirt, insects, or other objects from contacting the components positioned behind the display and the cover. In the present embodiment, the cover is protruded from the wall, but future embodiments may place the cover in different levels comparing to the wall, or other surfaces the user chooses to mount the control assembly. The display is positioned near the cover and is configured to display musical or other information, such as song's name, playing time, date, or volume. The display further comprises a user interface, which may comprise a plurality of buttons or a touchscreen. The user may use the user interface to perform different functions, such as change volume or change connected portable devices.

The switch is positioned near or on the cover and is configured to turn the control assembly on or off. The plurality of sockets is positioned near the cover and is configured to take different wire connections, such as USB, 3.5 mm, or other plugs. In the present embodiment, the user may choose to introduce a USB cable from a smartphone or other portable devices into the USB socket. The adapter plate is positioned between the outlet box and the cover and comprises an opening to allow the user to introduce the display to the adapter plate. The adapter plate is configured to hold the display in place and formed a barrier to prevent the display contacting the control board. The control board is positioned within the outlet box and is configured to process the information received from wired or wireless connection and send that information to the speaker and the display. The control board further comprises a storage unit and a control unit. The storage unit is configured to store musical or other information to the display or play on the speaker. The control unit is configured to receive user's instructions, musical, or other information from the display, wired, or wireless connections, stores certain information within the storage unit, and output relevant information to the speaker or the display. The outlet box is a concave structure configured to hold the control board and relevant wires between the control board and other structure. The outlet box is also configured to protect the control board and wires from contact with other objects or structures. The outlet box further comprises a plurality of fasteners, a plurality of fastener openings, and an outlet opening. The outlet opening is configured to all the user to install the control board and other wires into the outlet box. In the present embodiment, the user may install the outlet box into the appropriate housing or other concave structure on the wall or other surfaces, then secure the outlet box by introducing the plurality of fasteners into the plurality of fastener openings. After the outlet box is secured to the wall or other surfaces, the user may install the control board into the outlet box from the outlet opening and connects relevant wires from the control board to other components. Then the user may cover the outlet opening by fastening the adapter plate on the outlet opening.

The power supply adaptor is positioned at the opposite side of the outlet opening. Before the outlet box is mounted to the wall, the user may connect the control assembly to the home electricity. The transmitter and the receiver are positioned near the display and is configured to send and receive signals from the portable device or the speaker. The present embodiment uses Bluetooth signal, but future embodiments may use other types of signals to communicate between components. The speaker is connected to the control assembly by appropriate wiring. All the wired connections between the speaker and the control assembly is positioned inside the wall.

In the present embodiment, the user may install the speaker assembly to the appropriate position on the wall or other surfaces, connects relevant wires, then establish a wired or wireless link between the speaker assembly and the control assembly. Then the user may establish a wireless link by Bluetooth or other signals between the portable device and both speaker and control assembly. Then the user can select the sound files to play on the speaker. In an alternative embodiment, the user may upload some sound files into the storage unit of the control assembly and gives instructions from either the portable device or the user interface on the control assembly.

Although the invention has been explained in relation to its preferred embodiment, it is to be understood that many other possible modifications and variations can be made without departing from the spirit and scope of the invention as hereinafter claimed.

What is claimed is:

1. An in-wall wirelessly operable speaker control system comprising:
   a user interface;
   a processing unit;
   a wireless communication device;
   a mounting frame;
   a power source;
   a cover plate;
   at least one electrical communication interface;
   the user interface comprising at least one user control element;
   the at least one user control element comprising a speaker select interface;
   the user interface and the wireless communication device being electronically connected to the processing unit;
   the processing unit and the wireless communication device being electrically connected to the power source;
   the user interface, the processing unit, and the wireless communication device being connected to the mounting frame, wherein the mounting frame is configured to be mounted into a wall;
   the processing unit being configured to wirelessly communicatively couple with at least one speaker through the wireless communication device;
   the processing unit being configured to communicatively couple with a computing device through the wireless communication device, wherein the processing unit is configured to receive input signals from the computing device through the wireless communication device and send output signals to the at least one speaker through the wireless communication device based on the input signals;
   the mounting frame being an electrical outlet box configured to be installed into an electrical outlet cavity within a wall;
   the cover plate being connected to the mounting frame around the user interface;
   each of the at least one electrical communication interface being electrically connected to the processing unit; and
   each of the at least one electrical communication interface traversing through the cover plate.

2. The in-wall wirelessly operable speaker control system as claimed in claim 1 comprising:
   the processing unit being configured to receive at least one media playback control selection from the computing device as at least one of the input signals through the wireless communication device; and
   the processing unit being configured to send at least one media playback control signal as at least one of the output signals to the at least one speaker based on the at least one media playback control selection.

3. The in-wall wirelessly operable speaker control system as claimed in claim 1 comprising:
   the user interface comprising a digital display;
   the digital display being electronically connected to the processing unit; and
   the digital display being electrically connected to the power source.

4. The in-wall wirelessly operable speaker control system as claimed in claim 3 comprising:
   the processing unit being configured to display at least one current media attribute on the digital display.

5. The in-wall wirelessly operable speaker control system as claimed in claim 1 comprising: the at least one user control element comprising a power switch.

6. The in-wall wirelessly operable speaker control system as claimed in claim 1 comprising: the at least one user control element comprising a volume control interface.

\* \* \* \* \*